United States Patent [19]

Sinclair

[11] 4,345,516
[45] Aug. 24, 1982

[54] COOKING AND CUTTING IMPLEMENT

[76] Inventor: Lawrence L. Sinclair, 123 Old Carriage Rd., Ponce Inlet, Fla. 32019

[21] Appl. No.: 232,140

[22] Filed: Feb. 6, 1981

[51] Int. Cl.³ .............................................. A47J 43/18
[52] U.S. Cl. ......................................... 99/426; 30/316; 99/427; 99/430; 249/115; 425/184; 425/298
[58] Field of Search ......................... 99/426, 427, 430; 249/102, 115, 117; 425/298, 318, 184; 30/316, 340

[56] References Cited

U.S. PATENT DOCUMENTS

| | | | |
|---|---|---|---|
| D. 162,041 | 2/1951 | Klein | 99/426 X |
| D. 166,365 | 4/1952 | Thorward | D7/43 |
| D. 257,202 | 10/1980 | Schessl | 99/426 X |
| 634,892 | 10/1899 | Jenks | 30/316 |
| 1,421,749 | 7/1922 | Williams | 30/306 |
| 2,029,535 | 2/1936 | Langel | 294/160 |
| 2,584,536 | 2/1952 | Belt | 99/430 X |
| 3,780,978 | 12/1973 | Proul | 249/115 X |

Primary Examiner—Billy J. Wilhite
Attorney, Agent, or Firm—William M. Hobby, III

[57] ABSTRACT

A cooking and cutting kitchen implement apparatus has a hollow cylindrical ring member having one edge thereof formed into an angular cutting edge for cutting circular shapes, and a flat edge on the other edge thereof adapted to be placed on a grill for cooking an egg, or the like, therein. The ring member has a handle attached thereto with a spring clip connected into a pair of openings in the exterior of the ring and positioned so that the handle will be supported on the edge of the ring member to keep the handle off the grill when used for cooking. The handle may also be used on opposite side after turning the ring over. The ring may be lined with a solid lubricant polymer to prevent an egg, or the item therein, from sticking to the inside of the ring and the flat edge of the ring may have an annular groove therein.

9 Claims, 6 Drawing Figures

COOKING AND CUTTING IMPLEMENT

BACKGROUND OF THE INVENTION

The present invention relates to kitchen implements, and especially to a combination cooking and cutting implement for use in preparing certain foods in the kitchen.

In the past, it has been common to provide a variety of angular cutters for use in the kitchen for cutting dough, or the like, in making cookies, pastries, biscuits, hamburgers, or similar items. Such cutters are frequently made very light-weight, and without handles or with rigid handles attached thereto. In addition, it has been common to provide a ring shaped item for cooking an egg in to prevent the egg from spreading around on the griddle. These items typically have a fixed handle and are made of thin metal. Typical prior art cutters or holders can be seen in the following U.S. Patents:

| Patent No. | Inventor |
| --- | --- |
| D 162,041 | E. W. Klein |
| D 166,365 | G. W. Thorward |
| 634,892 | W. S. Jenks |
| 1,421,749 | B. S. Williams |
| 2,029,535 | A. L. Langel |
| 2,584,536 | A. H. Belt |

The present invention provides a combination kitchen utensil in which items such as cheese or bread can be cut with one side and which can be turned over and placed on a griddle for cooking an egg the same size as the cut item for making a sandwich or specialty food item, and includes an easily removable handle which is mounted to be supported off the griddle when cooking an egg, but to allow the ring to be turned over for cutting.

SUMMARY OF THE INVENTION

A kitchen cooking and cutting implement has a hollow cylindrical ring member open at each end having a cutting edge on one end and a flat edge on the other, and a pair of openings located in the exterior side of the ring member in a predetermined location. The kitchen implement has a handle which has arms connected thereto for connecting the handle to the ring member. The handle arms have bent end portions for engaging the openings in the ring member. Openings in the ring member are positioned to hold the handle so that it can rest on the edge of the ring when using the kitchen utensil on a griddle and can be moved to the other side of the ring for using the ring cutting edge for cutting a circular shape. The ring may be lined with a self-lubricating polymer lining on the interior thereof to prevent items being cooked from sticking to the ring. The flat edge of the ring member has an annular groove which helps prevent food items being cooked from running under the ring edge.

BRIEF DESCRIPTION OF THE DRAWINGS

Other objects, features and advantages of the present invention will be apparent from the written description and the drawings, in which.

DESCRIPTION OF THE PREFERRED EMBODIMENTS

Figures 1, 2:
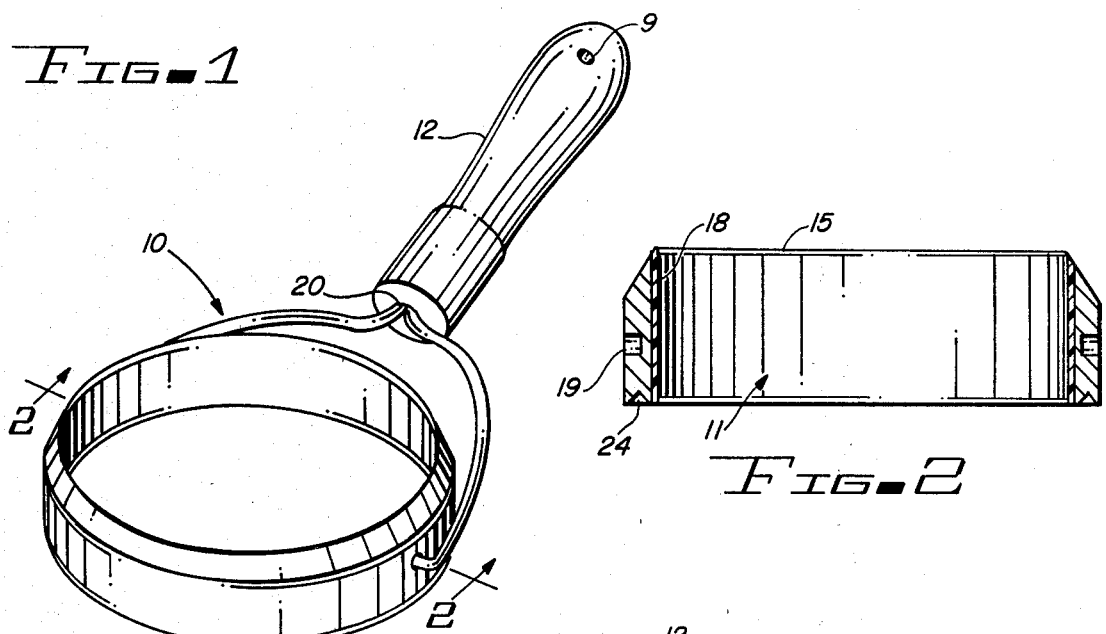
FIG. 1 is a perspective view of a kitchen utensil in accordance with the present invention.
FIG. 2 is a sectional view taken on the line 2—2 of FIG. 1.
Figure 3:
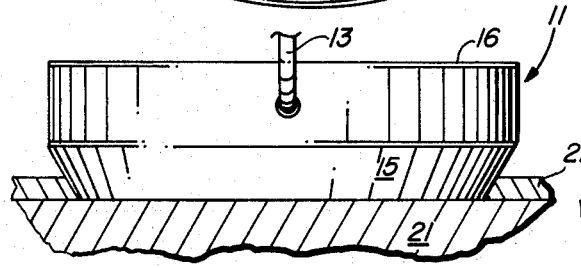
FIG. 3 is a side elevation of the ring portion of the kitchen utensil cutting dough.
Figure 4:
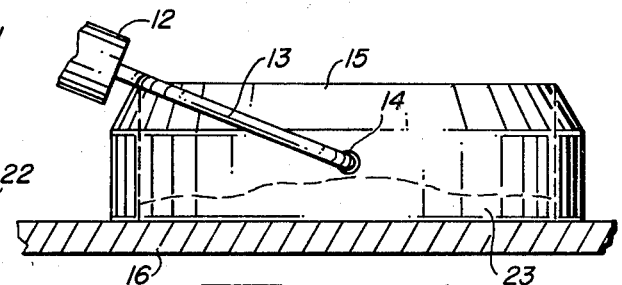
FIG. 4 is a side elevation of the ring portion cooking an egg on the griddle.

Referring to FIGS. 1 through 6 of the drawings, a kitchen utensil is shown having a ring 11 having a handle 12 attached to the ring 11 with handle arm members 13. The handle 12 has an opening 9 therethrough for hanging the utensil when not in use. Each arm member has a bent end portion 14 to form shafts to fit into openings 15 on opposite sides of the ring 11 in predetermined locations within the exterior of the ring 11. The ring 11 may be made of a metal, such as cast iron, stainless steel, or aluminum, and includes an angular cutting edge 15 on one end of the hollow cylindrical ring 11. The cutting edge has been beveled from the outside towards the inside, so that using the cutting edge 15 will cut a circle the same size as the inside of the ring 11. The other edge of the ring 11 has a flat edge 16 adapted to set flat on a griddle 17, as shown in FIG. 4, while the inside surface of the ring 11 can be coated with a non-stick surface 18, which surface can be polytriflorachloraethylene, or the like. The flat edge 16 of the ring 11 may have an annular V-groove 24 to capture and sear fluid material escaping beneath the ring while cooking on a griddle, especially an uneven griddle surface.

Figure 5:
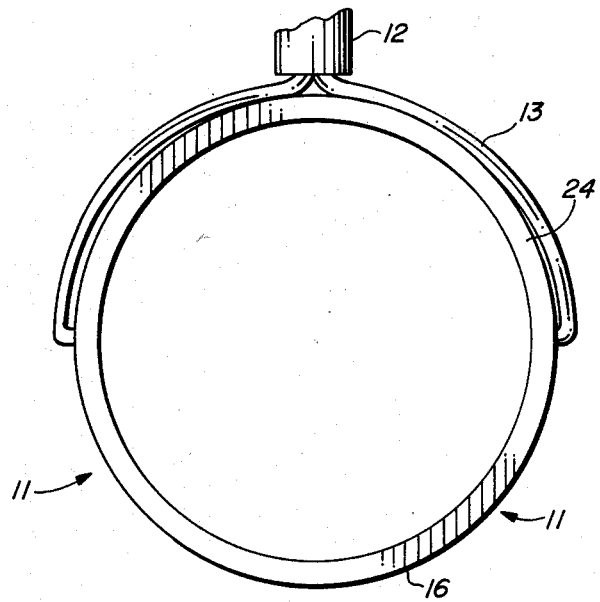
FIG. 5 is a top elevation of one side of the ring portion.
Figure 6:
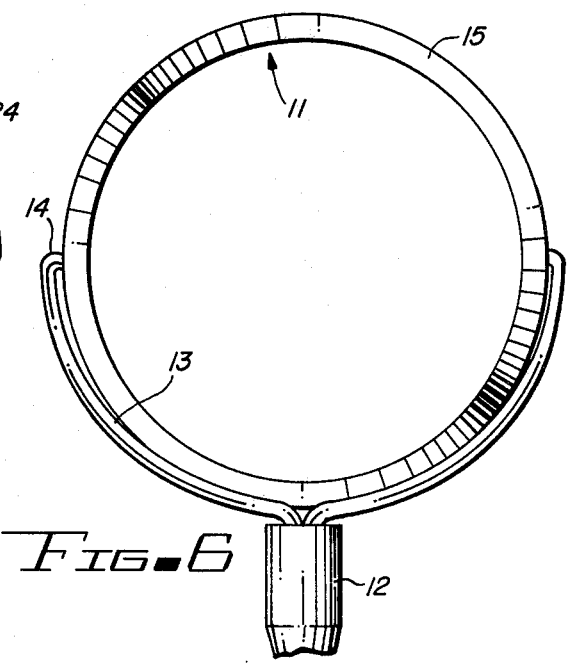
FIG. 6 is a top elevation of the other side of the ring portion.

The arms 13 can be easily attached or removed by pulling the spring arms outward to remove the shaft portions 14 from the openings 19. The arm portions are attached to the handle 12 by being snap fitted or attached in an opening 20 in the handle 12. In operation, the kitchen utensil 10 can have the cutting edge 15 facing towards a cabinet or cutting board 21 having dough 22 thereon and can cut the dough the same size as the inner surface of the ring 11 by rotating the ring 11 while holding the handle 12. The handle 12 can then be removed and snapped to the other side, as shown in FIG. 4, to place the flat edge 16 onto a griddle 17 for cooking an egg 23 with the handle on the opposite side of the ring 11. The handle can be snapped onto either side of the ring 11 as shown in FIGS. 5 and 6. The arms 13 and handle 12 will rest against the ring if the ring is allowed to fall or is placed on either side of the ring, as shown in FIGS. 4, 5 and 6. This keeps the ring propped up away from the griddle, as shown in FIG. 4, so that the handle won't get burned or hot, and holds the handle in a position to be easily grasped by the user. This overcomes the disadvantage of a handle that would otherwise be swung around the ring, but would have no support to keep the handle off the griddle and allows the same handle to be used whether cutting or cooking.

This combination utensil advantageously allows food items, such as cheese or bread, or the like, to be cut to the exact shape of the ring inside of the ring 11 and an egg, hamburger, or the like, to be cooked in the same ring of the same size for making a combination food item which might include an egg, cheese, bread, sausage, hamburger, or the like, all combined into one specialty item which can be quickly prepared in a neat, circular format utilizing the present kitchen implement. The ring of the present implement might typically be made of a metal having a linear on the inside, while the arms 13 would typically be made of a metal such as steel, and the handle would be made of a low heat conducting material such as wood. Accordingly, the present invention is not to be limited to the forms illustrated, which are to be considered illustrative rather than restrictive.

I claim:

1. A kitchen implement comprising in combination: a hollow cylindrical ring member open at each end and having a cutting edge on one end and a flat edge on the other end and a pair of openings located in the exterior side of said ring member; a handle; handle arm members connected to said handle and to the exterior of said ring member, said handle arm members engaging said pair of openings in said ring member, thereby allowing said arm members and handle to move relative to said ring and said arm members positioned to rest on one edge of said ring when said handle is not being held, whereby said ring member can cut a circular shape on one side with said cutting edge and can be placed on a griddle on the flat edge for cooking an egg, or the like, therein.

2. A kitchen implement in accordance with claim 1, in which said hollow cylindrical ring member flat edge has an annular groove formed therein to help prevent leakage under said ring member being used on a griddle, or the like.

3. A kitchen implement in accordance with claim 1, in which said hollow cylindrical ring member is coated on the interior with polytriflorachloraethylene.

4. A kitchen implement in accordance with claim 1, in which said handle arm members are spring loaded clips which can be snapped into or out of the openings in said cylindrical member.

5. A kitchen implement in accordance with claim 4, in which said handle arm members have a pair of bent end portions to form shaft members for snap fitting in the openings in the exterior side of said cylindrical ring member.

6. A kitchen implement in accordance with claim 5, in which hollow cylindrical member is made of metal.

7. A kitchen implement in accordance with claim 6, in which said ring implement is made of cast iron and said handle is made of a low heat conducting material.

8. A kitchen implement in accordance with claim 7, in which said handle is made of wood.

9. A kitchen implement in accordance with claim 2, in which said ring member flat edge annular groove is a V-shaped groove.

* * * * *